United States Patent Office 2,785,123
Patented Mar. 12, 1957

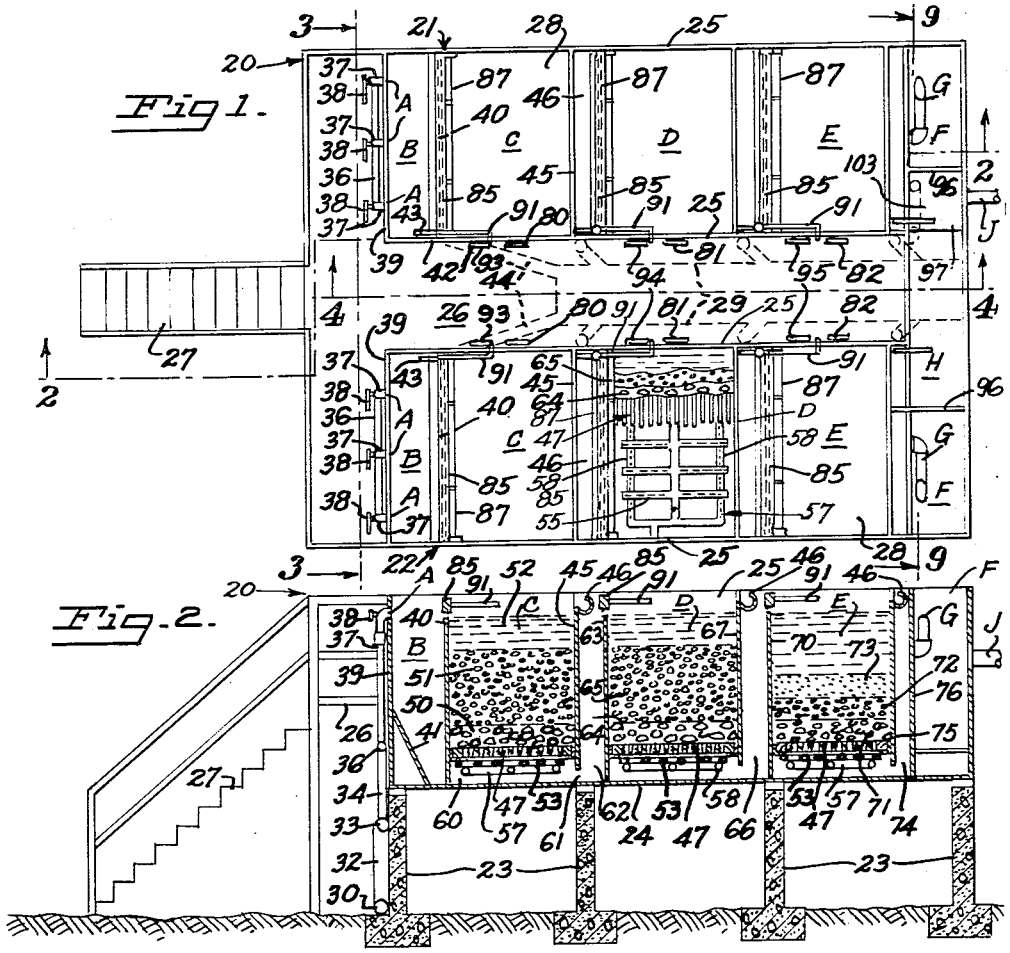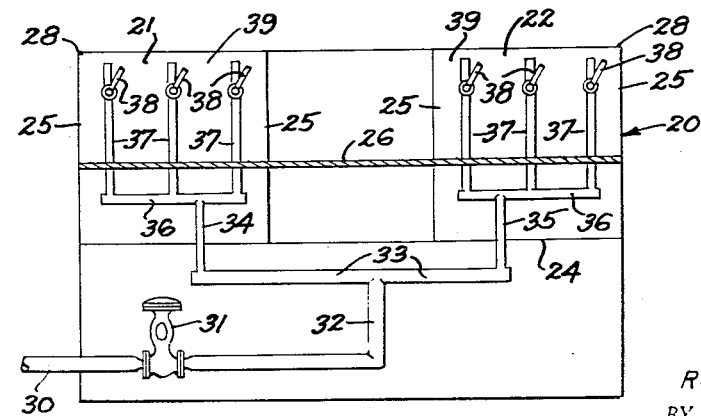

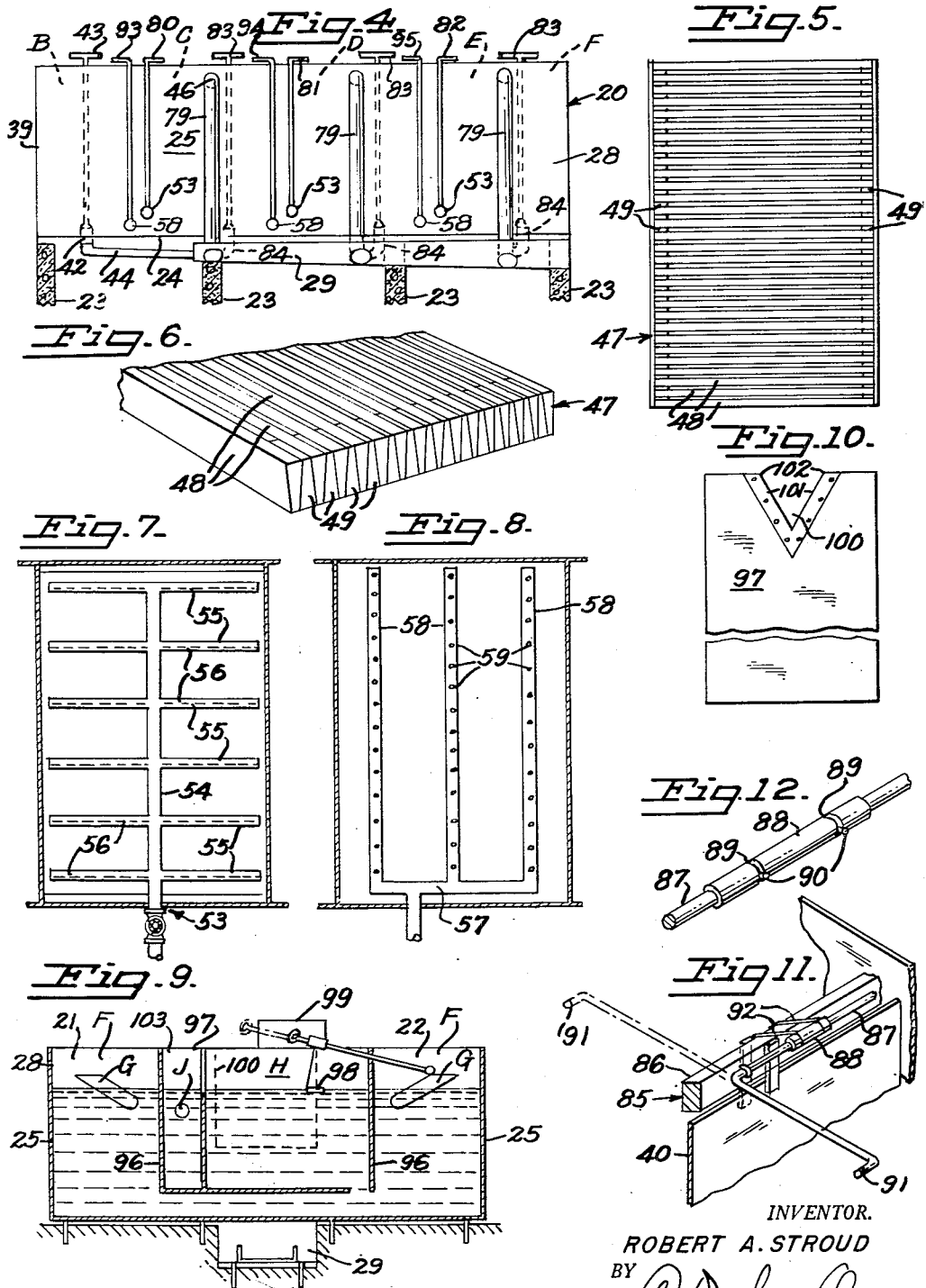

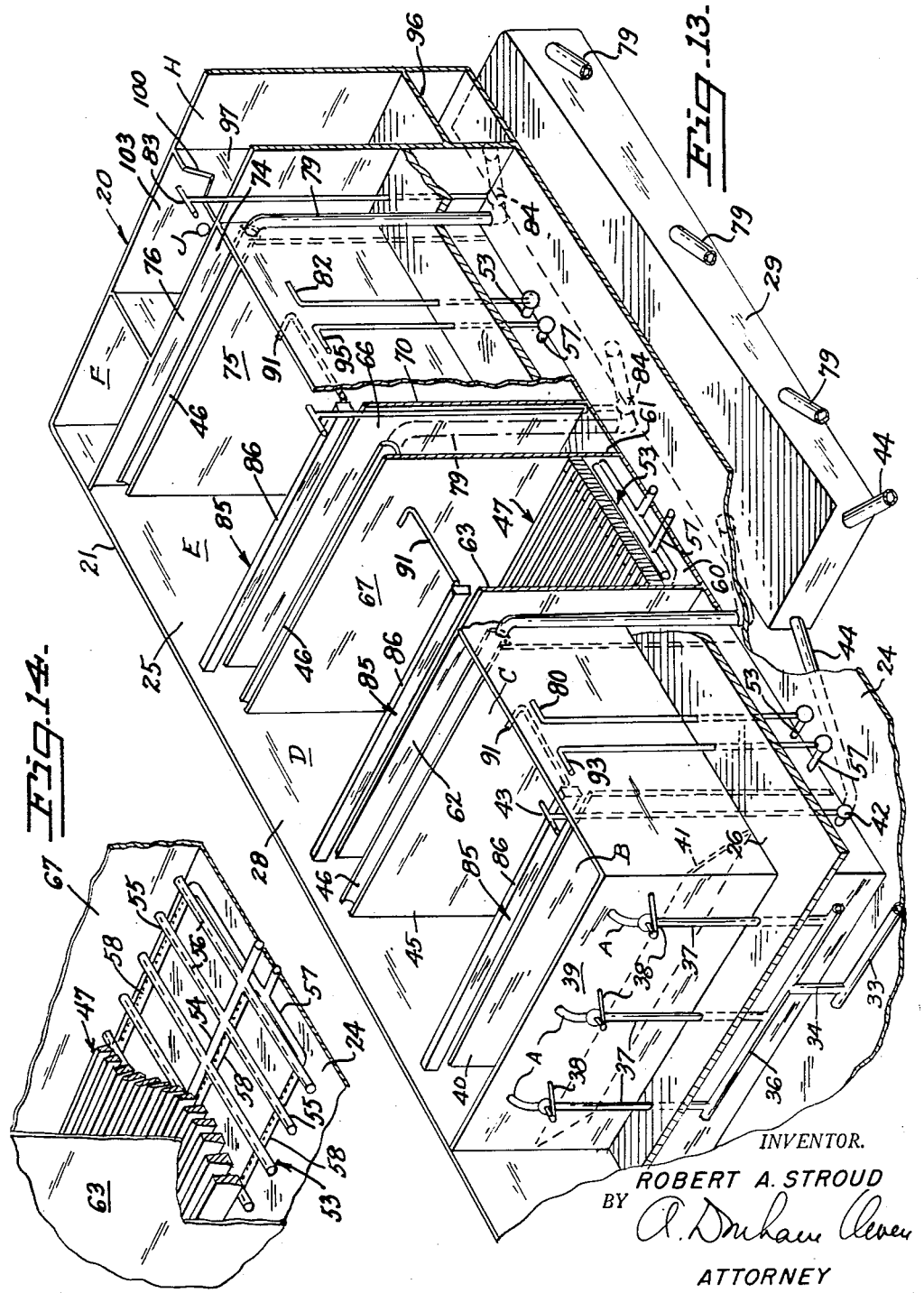

2,785,123

METHOD AND APPARATUS FOR PURIFYING WATER

Robert A. Stroud, San Gabriel, Calif., assignor to Tidewater Oil Company, New York, N. Y., a corporation of Delaware Application February 2, 1953, Serial No. 334,390

8 Claims. (Cl. 210—16)

This invention relates to an improved method and apparatus for purifying water.

Although not restricted to such use, the invention is particularly applicable to the purification of waste water in the oil fields, which accumulates from such things as the dehydrating processes of crude oil production. This waste water contains excessive amounts of oil, unstable salts, and other suspended matter which must be removed or reduced to a very small amount before the water may safely and legally be disposed of by sending it into a sewer, commingling it with a stream, pouring it into the ocean, or returning it to the ground. Local requirements vary according to the state law and according to the method of disposal. For example, in some places it is forbidden to place in a sewer water having an oil content of more than 25 parts per million; for disposal into the ocean, the oil content must be less than 10 parts per million; if the water is to be poured into the ground, it must be freed from foreign matter having plugging characteristics that would prevent it from being economically controlled.

The problem has become severe in many oil fields, where the waste water varies in oil content from about 100 to about 1000 parts per million. Since large amounts of such water accumulate and cannot be kept indefinitely in storage, many attempts have been made to solve the problem, but heretofore no method has been both sufficiently efficient and sufficiently inexpensive.

One of the main problems has been how to provide a filter system that will remove the foreign matter without itself becoming plugged. Oil has such an affinity for filter materials heretofore in use that even frequent backwashing would not loosen the oil, the oil accumulated rapidly, and soon plugged the filter permanently, so that the filter material had to be discarded and replaced. Heretofore a large quantity of backwash water polluted by bulky waste material had to be disposed of several times a day.

Another disadvantage of the prior art methods was that chemicals such as flocculating agents usually had to be added in order to remove the waste. These agents rendered the waste oil useless and unreclaimable, besides having the effect of doubling or tripling the quantity of sludge that had to be disposed of.

Also, prior art filters failed to remove excess calcium carbonate from the water, nor were they effective in removing the trivalent metals, such as iron and aluminum, that tended to cause plugging.

The present invention has solved the above problems. By it the oil content from waste water may be reduced from as much as a thousand parts per million down to fewer than ten parts per million. At the same time the other suspended matter is also removed from the water, so that the purified waste water has a very low plugging factor. Also, considerable oil can be reclaimed from the waste that is removed. A system constructed according to this invention can easily purify 70 gallons of water per minute, with an almost negligible percentage of the water being used to carry off the concentrated waste materials that are removed from the main body of the water.

This invention provides a method and structure whereby the water is passed through a series of filter tanks containing a crushed-rock filter material having a greater affinity for water than oil, i. e., tending to be wet by water rather than by oil. Preferably crystalline dolomite is used as it has other advantages which will appear later. At each tank the water enters at the upper end and passes downwardly through the filter material. Simultaneously, a number of divided air currents pass upwardly through the dolomite and water, continuously stripping the oil and some of the other suspended material from the dolomite, tending to cause this waste to float on top of the water and thereby helping to prevent the filter from becoming plugged. At intervals the water level is raised, and the floating foreign material may then be skimmed off. Shortly before the skimming, it is advisable to increase the air pressure considerably and thereby loosen additional particles and concentrate them still more toward the top. Also, if desired, water may be forced up from the bottom of each settling tank in a backwashing operation.

A further understanding of the invention together with more of its objects and advantages will appear from the following detailed description presented in accordance with 35 U. S. C. 112. The use of certain specified materials and the utilization of some details of construction which appear in this description are to be considered as illustrative examples only, rather than as limitations upon the invention or upon the appended claims.

In the drawings:

Fig. 1 is a top plan view of an apparatus embodying the principles of the invention.

Fig. 2 is a view in elevation and in section taken along the line 2—2 in Fig. 1.

Fig. 3 is a view in elevation and in section taken along the line 3—3 in Fig. 1.

Fig. 4 is a view in elevation and in section taken along the line 4—4 of Fig. 1.

Fig. 5 is a plan view of the retainer tray which supports the crushed filter material.

Fig. 6 is a fragmentary enlarged view in perspective of a portion of the tray of Fig. 5.

Fig. 7 is a top plan view of an air diffusing system, one of which is located beneath each retainer tray.

Fig. 8 is a top plan view of a washback water piping system, one of which is located beneath each retainer tray.

Fig. 9 is a view in section taken along the line 9—9 in Fig. 1 showing the outlet portion of the water purification system, the bottom portion being omitted.

Fig. 10 is a view in elevation of the V-notch weir located at the outlet from the measuring tank shown in Fig. 9.

Fig. 11 is an enlarged view in perspective of one of the weir gates.

Fig. 12 is a further enlarged detail of a portion of the weir gate closing mechanism.

Fig. 13 is a fragmentary view in perspective, partially in section and partially broken away, of one of the two purifying tanks, shown empty, with neither water nor the filter material shown.

Fig. 14 is a fragmentary view in perspective of a portion of Fig. 13 with some additional portions broken away.

*Brief summary of the water purifying system (Figs. 1, 2, and 13)*

Waste water is piped to the water purifier 20 and flows from spouts A into a first settling basin B where some sand and mud drop out. The water then flows directly into the upper end of a first filter basin C where it is filtered down through a layer of suitable material while a countercurrent of air bubbles up therethrough. From the bottom of the filter basin C the water flows upwardly and then enters the upper end of a second filter basin D where it is again filtered and again is subjected to a countercurrent of air. From the bottom of the basin D it flows upwardly and then into the upper end of a third filter basin E, where it is filtered a third time against a countercurrent of air. Water from the bottom of the filter basin E flows into a final stilling tank F through a swing pipe G and then passes via a measuring tank H to the outlet J.

The basic supporting structure

The water purifier 20 shown in plan in Fig. 1 preferably includes two identical parallel purifying tank systems 21 and 22 which may be used alternately, one being used to purify water while the other is cleaned, and vice versa. The principles of this invention apply, however, equally to a single system or to a multiple system.

The plant 20 is preferably supported off the ground by piers 23, preferably of reinforced concrete on which rest a platform 24 that may serve as the bottom for the tanks 21 and 22. The platform 24, as well as the sides 25 of the tank 21, 22 may be constructed from plate steel ¼" thick, cut to size and welded. A walkway 26, reached by stairs 27, may pass between the two units 21 and 22 and along their front face.

The tank 28 for each unit 21, 22 may be made from steel plate as before described and may be about six feet high, about six feet wide, and about nineteen feet long. Each tank 28 is divided by suitable weirs and partitions to provide the various compartments, settling basins, and filter basins. From various points, drain openings lead to a drain trough 29 where the small amount of concentrated waste is collected for disposal or reclamation in a manner described later on.

The water intake

The waste water will normally be conducted to the plant 20 by a suitable pipe 30. As shown in Fig. 3, a regulator 31 may be provided to control the rate of flow through the whole plant 20. Water passing through the regulator 31 enters the pipe 32, and, if the water is brought in at ground level, it may be conducted to a T 33 at a higher level. Respective pipes 34 and 35 may lead from the T 33 into one or the other of the two units 21 and 22, where a manifold 36 may divide the flow from each pipe 34, 35 into smaller pipes 37 that carry the water up still higher to the inlet spouts A. The spouts A empty into the plant 21 or 22, a separate inlet valve 38 preferably being provided for each pipe 37.

The first settling basin B

From the inlet spouts A the water flows into the first settling basin B, which is bounded by the tank bottom 24, the side walls 25, a front wall 39, and the first weir 40, which may be spaced about two feet from the wall 39. The basin B may have a sloping bottom 41 and a drain valve 42 through which the sand, mud, and other suspended matter which drops out of water in the settling basin B may be flushed out. This may be done by a worker in the walkway 26 turning the valve handle 43. (Figs. 4 and 13.) A drain pipe 44 leads from the valve 42 to the drain trough 29. (Figs. 4 and 13.)

The first filter basin C

The weir 40 forms the inlet into the first filter basin C, at the opposite end of which is a partition 45 somewhat higher than the weir 40. The partition 45 supports a skimmer tube 46 whose operation to remove waste will be discussed later in connection with the backwashing operation.

A retainer tray 47 for holding the filter material (Figs. 5, 6, 13, and 14), is supported by and extends horizontally across the space between the walls 25, the weir 40, and the partition 45. The tray 47 (Figs. 5 and 6) preferably comprises a rack of parallel wedge-shaped boards 48 spaced apart at their ends by inverted wedge-shaped blocks 49, so that the spacing between the boards 48 is narrower at the upper surface than at the lower surface. For example, in a 4' x 6' tray 47 in one plant 20, the boards 48 were approximately 2½" high, the width of the top surface of each board 48 was approximately ¾ inch, and its width at the bottom approximately ⅜ inch. The spacing between the boards 48 at their top was approximately ⅜ inch and at their bottom was approximately ¾ inch. This provides an adequate outflow opening for the water while at the same time preventing the crushed rock which serves as the filter material from falling through, and it adequately prevents the rock from lodging in the interstices of the tray 47.

The filter in the basin C preferably comprises two layers 50, 51 of crushed rock (Fig. 2), supported on the tray 47, the bottom layer 50 being relatively coarse and the upper layer 51 being medium-coarse. I have found that crystalline dolomite is a preferable material, because it is relatively imporous and is readily freed from oil or other scum. In other words, what is desired is a material that will catch the oil and take it out of the water passing down through the filter, but will not absorb it and will give up the oil readily when subjected to an upwardly passing current of air. Dolomite is one material possessing this quality; it does not absorb the oil particles; they just adhere loosely to the dolomite, so that an upflow of air or water knocks the oil particles loose. Any other rock having the same general quality could be used, and the material could be either natural or synthetic. In the plant 20 shown, a very successful operation was obtained with a bottom layer 50 of ¾" dolomite about nine inches deep and an upper layer 51 of ⅜" dolomite about thirty inches deep. About twelve inches freeboard 52 of water may be left above the upper layer 51.

Another way of expressing the qualities required in the filter material, which quality is possessed by crystalline dolomite and should be found in any material substituted for the dolomite, is that the rocks should have a preference for wetting by water rather than for wetting by oil, and should have an affinity for objectionable metals that may cause plugging. For example, sulfates, carbonates, silicates and oxides of the lighter metals such as calcium and magnesium may be used as they are preferentially wet by water rather than by oil or by the other organic liquids. For example, crushed glass possesses this quality. Compounds of the heavy metals appear to be preferentially wet by organic liquids and have an affinity for oil over water and therefore do not give as satisfactory a performance in the invention.

The preferential wetting or affinity of the filter material for water provides an adsorptive characteristic which makes it possible to free the oil from the filter material during backwashing.

As mentioned above dolomite also has an affinity for iron, aluminum, and other trivalent metals which are objectionable and may cause plugging. Furthermore, passing the water through dolomite removes excess calcium carbonate from the water.

Crystalline materials, such as crystalline dolomite, are preferable to amorphous materials because they are less likely to be soluble in the water and less likely to break up and change the particle size.

It may be pointed out also that water that is filtered through a dolomite bed is extremely stable, partly because no flocculating chemicals are used in this invention, and therefore the water is not subject to after-flocculations. Also, when chemicals are added to flocculate oil and impurities, they invariably render the oil useless and unreclaimable and increase the quantity of sludge which must be disposed of to two or three times the amount formerly present. This means that heretofore much larger quantities of backwash water had to be used and disposed of and that the material disposed of was completely useless waste. With the present invention the chemical composition of the removed oil remains the same as it was before removal, and it may be reclaimed in normal field treating plants.

An important feature of the present invention is that it does not rely solely on the dolomite or any other filter material. Instead, a system is provided for continually causing the oil and other waste to float upwardly and to concentrate at the top so that the dolomite is kept freer from the oil than it would otherwise be. At intervals of time, the filter material is almost completely freed from the waste by backwashing, as will be described later. This novel flotation feature is important because the plugging of the filter is one of the danger spots in this type of water purification, and it is accomplished by countercurrents of air. An air diffusing system 53 is located in the basin C below the tray 47 (and also in basins D and E below their trays 47) as shown in Fig. 7 as well as in Fig. 2. A central conduit 54 from a suitable air compressor (not shown) serves as a manifold and conducts the air stream into a number of parallel pipes 55. Each pipe 55 is provided with a large number of relatively small air slots 56 which leak the air out normally at a pressure of about two to ten pounds p. s. i. This amount is sufficient for normal operation, and when the filter bed 50, 51 becomes partially plugged, it may be unplugged by raising the air pressure to about 150 pounds p. s. i. and by backwashing.

Thus some of the advantages of the present invention are:

1. The oil is separated completely from the water by the use of dolomite in conjunction with the air countercurrent.
2. The quantity of trivalent metal compounds, which tend to cause plugging, is materially reduced.
3. The quantity of excess calcium carbonate in solution is materially reduced.
4. Increased concentration of the removed materials at the top of the filter basins is obtained by the countercurrent of air.
5. Extremely stable water results from the treatment.
6. Relatively small quantities of backwash water are used to float off the waste.
7. The oil may be reclaimed from the waste, because its chemical composition remains unchanged.
8. Due to the concentration and small amount of backwash water required, the waste, whether reclaimed or not is but a fraction in quantity of the amount that had to be disposed of in previous set-ups.
9. The purified water is very clean.

To make backwashing possible, a water manifold 57 is provided beneath each tray 47 and also beneath the air diffusing system 53. This system is shown in Fig. 8 where the manifold 57 conducts water into a series of parallel pipes 58. Each pipe 58 has a series of slots 59 from which water issues under pressure. The operation, together with the operation of a weir gate and a waste skimmer, are described below in the section dealing with backwashing. During normal operation no water issues from the backwashing system 57, and the countercurrent of air is at relatively low pressure, though very important.

Water, during normal operation, enters the basin C over the weir 40, flows down through the filter layers 51, 50 (while air bubbles up therethrough), through the tray 47 and into the space 60 therebelow. Then it flows out through an opening 61 in the partition 45 and up into a passageway 62 between the partition 45 and a second weir 63, identical with the weir 40.

The second filter basin D

The second filter basin D is identical in size, shape and operation with the first filter basin C. If desired, there may be a change in the filtering materials 64, 65, supported on the tray 47, but normally the best operation is obtained by exactly the same disposition as in the filter basin C. Water that has passed through the basin D flows up into a passageway 66 between a partition 67 (identical with the partition 45 and having a skim tube 46) and over a third weir 70 into the third filter basin E.

The third basin E

The third filter basin E is the same in size and shape as the filter basins C and D and differs only in the filter material normally used therein and supported on the tray 47. Preferably the bottom layer 71 is about nine inches of coarse (¾") dolomite, the middle layer 72 about nine inches of ⅜" dolomite, and the upper layer 73 about nine inches of relatively fine dolomite, preferably that which would pass a #10 mesh screen and be caught on a #30 mesh screen.

After passing through the basin E, the water passes up into a passage 74 betweent a third partition 75 and a fourth partition 76 to the swing tube G. Preferably the tube G is a swinging pipe so that its outlet level may be raised or lowered. At the outset, the swing pipe G is set high (about ½" below the edge of the skimmer pipe 46). Then as the filter bed tends to become plugged with the solids, the pipe G is swung down to gradually lower the actual outlet into the stilling basin F. The filter ceases to function when the water level in the basin E rises to the top of the overflow skimmer with the swing pipe G down at its lower level, and this is a clear indication to the operator that the final compartment is plugged and that it is time to commence the backwashing operation.

The backwashing operation

As has already been stated, the filter beds eventually tend to become clogged with the solids in the oil or by the layers of oil on the filter particles, and they then need to be purified by backwashing.

The backwashing may be carried on while the water is being passed through the filter by first increasing the air pressure in any one or all of the filter beds. This is done by turning a handle 80, 81, or 82 to raise the pressure from its normal rate of 2 to 10 pounds per square inch up to 150 pounds. The bubbling is intensified, frees the oil from the dolomite particles, and carries it up to the top of the basin so that the scum and oil are floating on or near the top of the water.

The next thing is to raise the level of the water so that the waste particles can be flowed off through the skimmer tubes 46 located on the upper edge of the partitions 45, 67, and 75. The first step in this action is to cause the appropriate weir gate 85, each of which comprises a wooden or other bar 86 (for example, a redwood 3" x 4" beam) extending the width of the tank and controlled by a pivoting rod 87. The rod 87 fits rotatably in a small piece of pipe 88 having a pair of slots 89 that extend about 170° around part of the circumference and receive a pair of keys 90 secured to the rod 87, as shown in Fig. 12. This structure gives about 170° lost motion between the off and on position of the rod 87; so the two operative positions of the handle 91 lie about 180° apart. Linkage pins 92 attached to the pipe 88 and to the wood beam 86 enable the movement of the handle 91 to raise or lower the beam 86, thereby changing the height of the weir 40, 63, or 70 by about four inches.

When the weir gate 85 is in place, the special backwash pipes 58 are used to send water up through the tank from the bottom. The rate of this back flow is controlled by the handles 93, 94, or 95. This backwash further cleanses the dolomite from oil and other foreign particles and helps carry them to the top, the air still being kept at its 150-pound level. When the water level rises, the top portion which includes the greatest concentration of oil and other waste particles, floats over the edge of the skimmer tube 46 and flows down pipes 79 into the drain trough 29. Handles 83 may be used to open and close drain valves 84. (Figs. 4 and 13.)

The frequency of this operation depends entirely on how often it is needed. When enough water has been flowed to carry off the desired amount of scum, the weir gate 85 is raised again and the water level drops.

*The final stilling tank F and the outlet J*

Water flows into the final stilling basin F through the tube G and flows beneath partitions 96 (Fig. 9) into a measuring tank H, which it enters from the bottom. This tank H is provided with a V-notch weir 97 (Fig. 10), with a float 98, and with a flow meter apparatus 99. The V-notch 100 helps give an indication of the flow rate. The depth of the notch 100 may be about 8" so that the two sides 101 of the V are the same length as the distance 102 across the top of the V. With such a construction, 1" in height would equal about a gallon per minute and 4¾" would equal the usual flow of about seventy gallons per minute. The flow meter 99 may have an ink recording device (not shown) to keep a permanent record of the flow of water through the device.

The purified water which flows over the V-notch weir 97 goes into a tank 103 (Fig. 9) from which it may be conducted to the sewer or into a stream by means of pipe J.

*Summary of operation*

The operation of the device is as follows: Water enters one or the other of the two systems 21 and 22 and goes into the first settling basin B. There sand, mud, and other solids drop out and are carried at intervals into the drain trough 29 whenever the valve 42 is opened by turning the handle 43. The water leaving the basin B flows over the weir 40 into the first filter basin C. It passes downwardly through the medium and coarse dolomite layers 51, 50, while at the same time air is bubbled upwardly from the system 53, at a pressure of about 2 to 10 pounds p. s. i.

When water has passed vertically downwardly into the filter bed, it is passed upwardly through the passage 62 and then over the second weir 63 into the second filter basin D. There it again passes down through dolomite layers 65, 64 while air bubbles upwardly, and from the bottom of this basin D it flows upwardly through the passage 66 and then over the third weir 70 into the third filter basin E. Here it passes through fine dolomite 73 as well as through the medium and coarse dolomite layers 72 and 71 and again air bubbles upwardly during this passage. The water then passes up into the outlet tube G which is swung to the proper level to insure the proper flow. The purified waste water passes out from the outlet tube G into the final stilling basin F and then into the measuring tank H and from there over the V-notch weir 97 into the exit tank 103 and the outlet pipe J.

When the level of the tube G has to be relatively low to keep up the flow, this is an indication that it is time to commence the backwash operation. The backwashing operation commences by first increasing the air pressure to about 150 pounds and bubbling it for about five minutes upwardly against the flow of water through the filter beds and then closing the weir gates 85, raising the water level by means of water introduced through the backwash, and taking off the top layer by means of the overflow skimmer tubes 46. When the backwashing is completed, the weir gates 85 are again opened and the water level drops.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A method for purifying waste water containing petroleum and other deleterious substances for which dolomite has less affinity than for water comprising serially passing said waste water downwardly through each of a series of coarsely and medium coarsely crystalline dolomite filter beds while simultaneously bubbling a relatively slow countercurrent of diffused air upwardly through said bed and said water, so that the impurities tend to be floated to the top of each, and maintaining a layer of water above each bed where said impurities are concentrated, purifying each said bed at intervals by increasing the air flow therethrough to a relatively high pressure, raising the level of the water, and then skimming off the waste and top portion of the water.

2. The method of claim 1 in which water is backwashed under pressure from below each said bed up through it before said skimming step.

3. The apparatus of claim 8 in which said means for skimming comprises a generally horizontal tube open on part of the upper part of its surface and higher than said weir; and means for raising the height of said weir to raise the water level above said tube.

4. An apparatus for filtering waste water to cleanse it from petroleum residue comprising a series of filter tanks, each having side walls, rear partitions, and a front weir over which the water enters; a retainer tray in each tank comprising a series of parallel spaced-apart boards; a layer of coarse dolomite particles supported on each said tray; a layer of medium dolomite particles supported on each said layer of coarse dolomite; and in the final tank a layer of fine dolomite supported on the layer of medium dolomite; a plurality of perforated conduits beneath said retainer tray; means for supplying compressed air to each of said conduits so that air can be bubbled up through the downflowing water; a skimming tube on the upper edge of each partition for flowing waste particles away therefrom, said skimming tube being higher than said weir; and a weir gate directly above each said weir and adapted to be moved down against the upper edge of said weir to raise the water level thereof above the edge of said skimming tube.

5. An apparatus for filtering petroleum residue out of waste water comprising a series of three filter tanks each having side walls, rear partitions, and a front weir over which the water enters each tank; a retainer tray in each tank comprising a series of parallel spaced-apart boards; a first layer approximately nine inches deep of dolomite particles of approximately ¾" mesh supported on each said tray; a second layer approximately thirty inches deep of dolomite particles of approximately ⅜" mesh supported on said first layer in the first two tanks; a layer similar to said second layer approximately nine inches deep in the third tank; in the third tank a third layer approximately nine inches deep of fine dolomite supported on said layer of medium dolomite; a first series of perforated tubes beneath said retainer tray; means for sending compressed air into each of said tubes so that air can be bubbled up through the downflowing water; a second series of perforated tubes adjacent said first series; means for sending water under pressure thereinto; a skimmer tube on the upper edge of each partition for flowing waste particles away therefrom, said skimmer tube being higher than said weir and comprising a tube with an open slot therealong; and a weir gate directly above each said weir and adapted to be moved down against the upper edge of said weir to raise the level thereof above the edge of said skimmer tube.

6. A method of purifying waste water containing oil and other deleterious substances having plugging characteristics, a viscosity greater than that of water, and an affinity for dolomite less than that of water, comprising flowing said waste water down through a bed of suitably sized coarse and medium-coarse particles of crystalline dolomite, while at the same time passing diffused air from below the dolomite upwardly through the dolomite and the water, thereby removing waste particles whose viscosity hinders their passage through the dolomite mass and carrying them up to the top of the water, and skimming said waste particles off the top of the water at intervals.

7. A method for purifying waste water containing petroleum and other deleterious plugging substances for which dolomite has less affinity than for water, including especially those substances having a viscosity greater than that of water, comprising serially passing said waste water downwardly through each of a series of filter beds of crystalline dolomite while simultaneously bubbling a relatively slow countercurrent of diffused air upwardly through said bed and said water, so that the impurities tend to be floated to the top of each, and maintaining a layer of water above each bed, in the top portions of which layer said impurities are concentrated.

8. An apparatus for filtering petroleum residues from waste water comprising a plurality of filter tanks each having side walls, a rear partition, and a front weir over which the waste water enters; retainer means spaced above the bottom of each tank; a layer of coarse filter particles, supported on each said retainer means; a layer of medium filter particles supported on each said layer of coarse particles; and in the final tank a layer of fine filter particles supported on the layer of medium particles, all said filter particles being of a substance having a preference for wetting by water rather than by said petroleum residues; a first plurality of perforated means beneath said retainer tray; means for supplying compressed air to each of said perforated means so that air can be bubbled up through the downflowing water; a second plurality of perforated means adjacent said first means; means for supplying water under pressure to said second perforated means; and means on the upper edge of each partition for skimming waste particles away therefrom.

References Cited in the file of this patent

UNITED STATES PATENTS

| | | |
|---|---|---|
| 530,784 | Lowcock | Dec. 11, 1894 |
| 606,592 | Snell | June 28, 1898 |
| 1,096,868 | Stevenson | May 19, 1914 |
| 1,198,039 | Krause | Sept. 12, 1916 |
| 1,638,977 | Avery | Aug. 16, 1927 |
| 1,738,521 | Bomhoff | Dec. 10, 1929 |
| 1,765,424 | Hageman et al. | June 24, 1930 |
| 1,887,774 | Meinzer | Nov. 15, 1932 |
| 1,947,709 | Garrison | Feb. 20, 1934 |
| 1,990,214 | Zapffe | Feb. 5, 1935 |
| 2,224,624 | Adams et al. | Dec. 10, 1940 |
| 2,352,901 | Klein | July 4, 1944 |
| 2,632,733 | Sherwood | Mar. 24, 1953 |

FOREIGN PATENTS

| | | |
|---|---|---|
| 161,735 | Great Britain | Apr. 21, 1921 |
| 859,947 | France | Jan. 2, 1941 |